(12) United States Patent
Yih (10) Patent No.: US 6,254,067 B1
(45) Date of Patent: Jul. 3, 2001

(54) FLUID REGULATING DEVICE FOR USE WITH A HYDRAULIC CYLINDER TO OBTAIN A VARIABLE SHOCK ABSORBING EFFECT

(75) Inventor: Johnson Yih, Taichung Hsien (TW)

(73) Assignee: Giant Manufacturing Co., Ltd., Taichung Hsien (CH)

( * ) Notice: Subject to any disclaimer, the term of this patent is extended or adjusted under 35 U.S.C. 154(b) by 0 days.

(21) Appl. No.: 09/366,699

(22) Filed: Aug. 2, 1999

(51) Int. Cl.[7] ..................................... F16F 9/342
(52) U.S. Cl. ..................... 267/64.22; 188/282.7; 188/299.1; 188/314; 188/318; 188/322.2
(58) Field of Search .............. 267/64.22, 64.15; 188/266.2, 266.6, 314, 318, 322.13, 322.2, 282.1, 282.7, 299.1; 280/707, 709, 710

(56) References Cited

U.S. PATENT DOCUMENTS

| | | | |
|---|---|---|---|
| 3,062,330 | * 11/1962 | Lyon, Jr. ........................... | 188/299.1 |
| 4,153,237 | * 5/1979 | Supalla ............................... | 188/314 |
| 4,491,207 | * 1/1985 | Boonchanta et al. ............ | 188/322.13 |
| 4,546,959 | * 10/1985 | Tanno ................................ | 188/64.15 |
| 4,872,537 | * 10/1989 | Warner ............................. | 188/282.9 |
| 4,936,424 | * 6/1990 | Costa ................................. | 188/314 |
| 5,351,790 | * 10/1994 | Machida ............................ | 188/314 |

* cited by examiner

Primary Examiner—Robert J. Oberleitner
Assistant Examiner—Mariano Sy
(74) Attorney, Agent, or Firm—Foley & Lardner (57) ABSTRACT

A fluid regulating device includes a regulator housing that confines a valve receiving chamber and a fluid chamber filled with hydraulic fluid. The regulator housing is formed with a fluid opening that is in fluid communication with the valve receiving chamber and that is connected fluidly to a fluid port of a hydraulic cylinder device. A pneumatic cylinder device includes a cylinder housing with a piston member slidingly and sealingly disposed therein to divide the same into a volume-variable pressurized gas compartment and a volume-variable fluid compartment which is in fluid communication with the fluid chamber via a fluid aperture. A regulating valve unit is disposed in the valve receiving chamber to control flow rate of the hydraulic fluid between the fluid opening and the fluid chamber.

9 Claims, 7 Drawing Sheets

FLUID REGULATING DEVICE FOR USE WITH A HYDRAULIC CYLINDER TO OBTAIN A VARIABLE SHOCK ABSORBING EFFECT

FIELD OF THE INVENTION

The invention relates to a fluid regulating device, more particularly to a fluid regulating device for use with a hydraulic cylinder device to obtain a variable shock absorbing effect.

BACKGROUND OF THE INVENTION

A hydraulic cylinder device is generally installed in a bicycle to serve as a shock absorbing apparatus to absorb shock which results when the bicycle travels along an uneven road surface. Although, there are different types of shock absorbing apparatus, such as a spring-type or hydraulic type or a combination of both types, presently available in the market, they are not adjustable in order to provide variable shock absorbing effect so as to conform with the road conditions.

SUMMARY OF THE INVENTION

The main object of this invention is to provide a fluid regulating device for use with a hydraulic cylinder to obtain a variable shock absorbing effect.

Accordingly, the fluid regulating device of the present invention is used together with a hydraulic cylinder device which includes a hydraulic cylinder body filled with hydraulic fluid, and a piston. The hydraulic cylinder body includes a first end portion formed with a fluid port, and in a second end portion. The piston is slidingly and sealingly disposed in the second end portion, and is movable in a first direction toward the first end portion to cause the hydraulic fluid to flow out of the fluid port, and in a second direction away from the first end portion in response to return flow of the hydraulic fluid into the fluid port. A piston rod has a connecting end connected to the piston, and a coupling end that extends out of the second end portion of the hydraulic cylinder body. The fluid regulating device includes a regulator housing, a pneumatic cylinder device, a regulating valve unit, and a valve actuator. The regulator housing confines a valve receiving chamber and a fluid chamber adjacent to the valve receiving chamber. The regulator housing is formed with a fluid opening that is in fluid communication with the valve receiving chamber and that is adapted to be connected fluidly to the fluid port. The fluid chamber is filled with the hydraulic fluid. The pneumatic cylinder device includes a cylinder housing with a piston member slidingly and sealingly disposed therein. The piston member divides an interior of the cylinder housing into a volume-variable gas compartment and a volume-variable fluid compartment on opposite sides of the piston member. The gas compartment is filled with a pressurized gas therein. The cylinder housing is formed with a fluid aperture that maintains fluid communication between the fluid chamber and the fluid compartment. The regulating valve unit is disposed in the valve receiving chamber to control flow rate of the hydraulic fluid between the fluid opening and the fluid chamber. The regulating valve unit includes a valve body mounted in and in sealing contact with the valve receiving chamber. The valve body is formed with a plurality of valve channels for fluid communication between the fluid opening and the fluid chamber. Each of the valve channels is formed with a respective rate control passage. The rate control passages of the valve channels have different diameters. A plurality of valve members are disposed respectively in the valve channels. Each of the valve members is capable of being actuated to move from a normal blocking state, where fluid communication between the fluid opening and the fluid chamber is interrupted in the respective one of the valve channels, to an unblocking state, where fluid communication between the fluid opening and the fluid chamber is permitted in the respective one of the valve channels. The valve actuator is associated with the regulating valve unit and is operable so as to actuate a selected one of the valve members to move from the blocking state to the unblocking state.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Referring to FIGS. 1, 2, 3A, 3B and 4, a fluid regulating device 30 of the present invention is provided for use with a hydraulic cylinder device 20 to form a shock absorbing apparatus with a variable shock absorbing effect. The fluid regulating device 30 includes a regulator housing 301, a pneumatic cylinder device 302, a regulating valve unit 303, and a valve actuator 50.

Figure 3A:
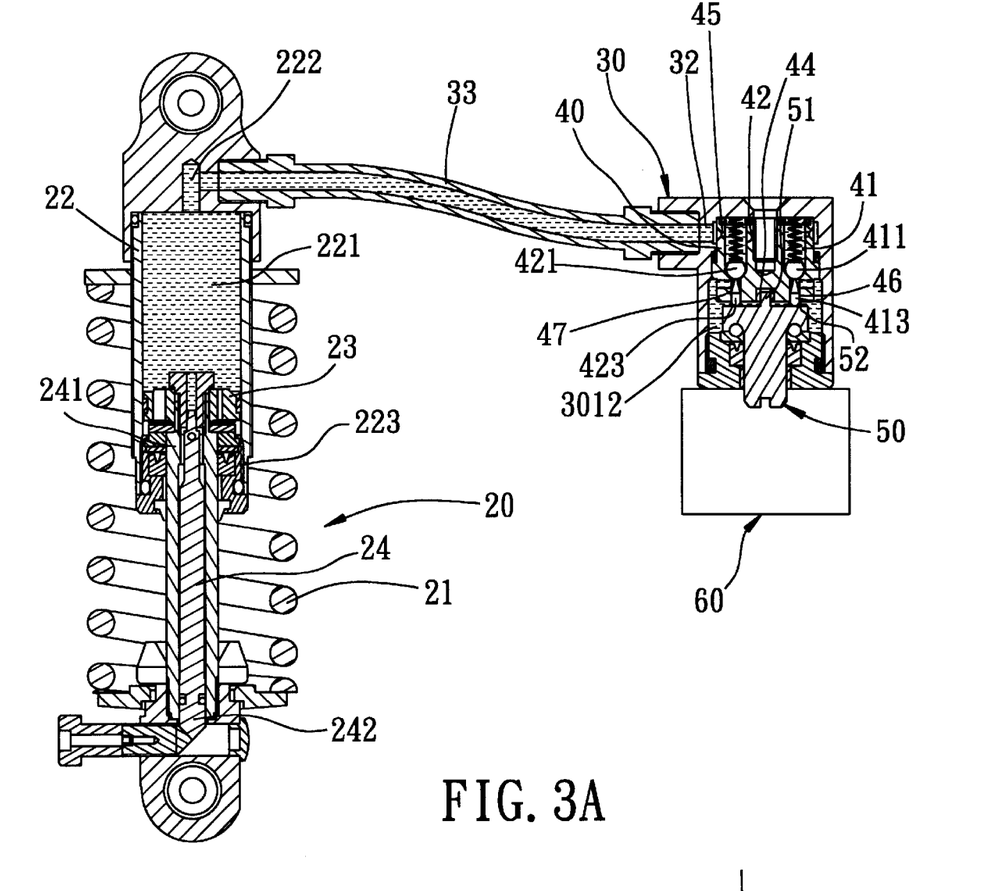
FIG. 3A is a sectional view of the fluid regulating device shown together with a hydraulic cylinder device.
Figure 3B:
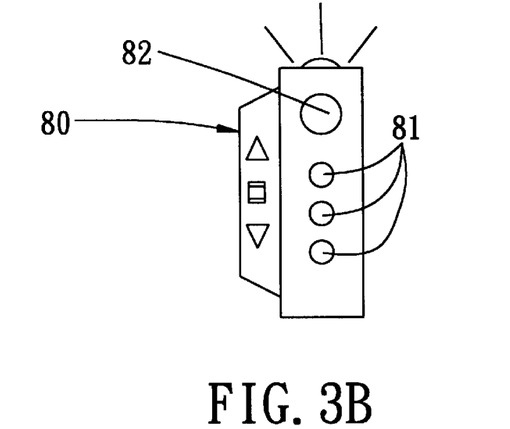
FIG. 3B illustrates is a remote control unit employed in the fluid regulating device of the present invention.
Figure 4:
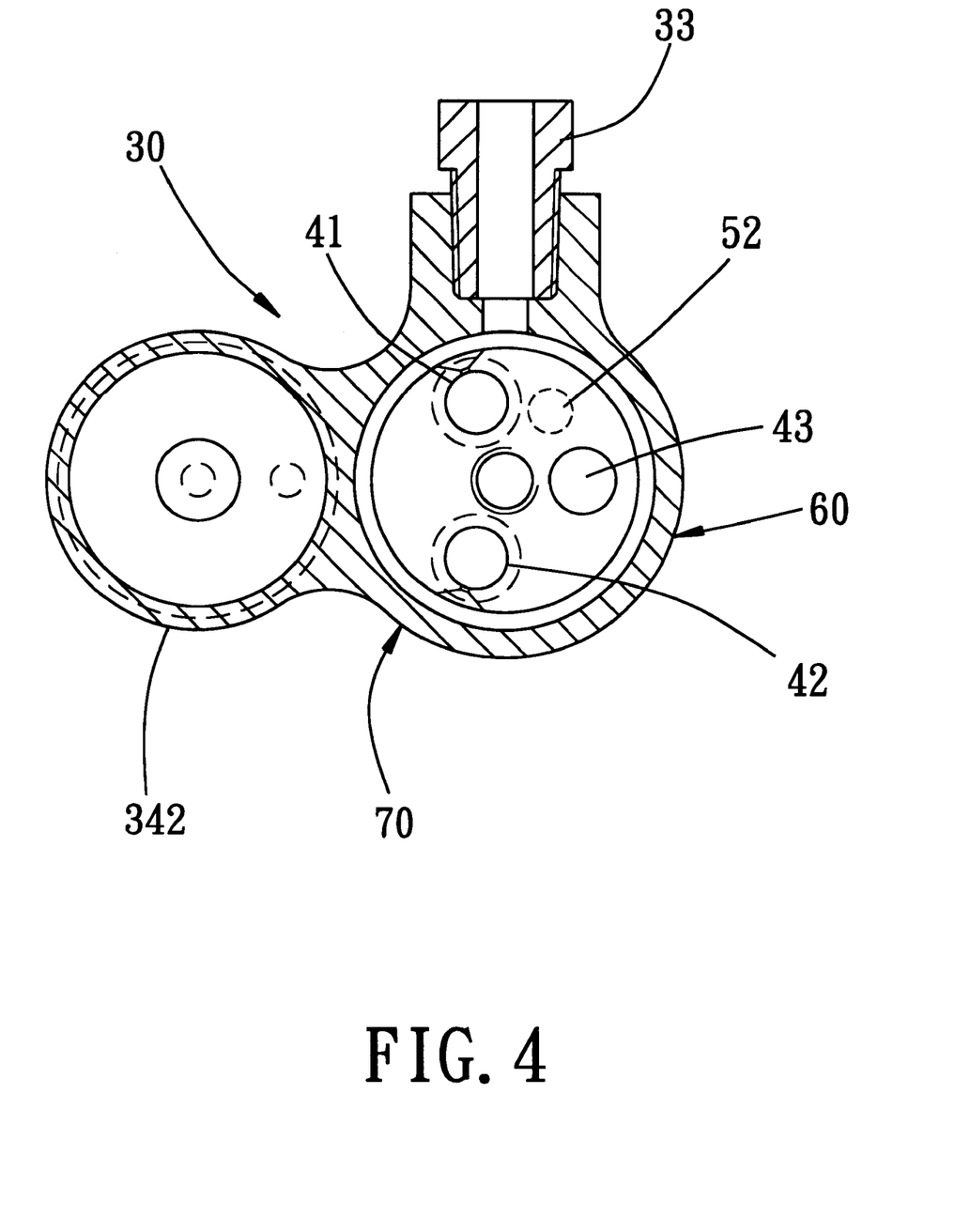
FIG. 4 is a top view of the fluid regulating device of the present invention taken along line 4—4 of FIG. 2.

As illustrated, the hydraulic cylinder device 20 includes a hydraulic cylinder body 22 filled with hydraulic fluid. The hydraulic cylinder body 22 includes a first end portion 221 formed with a fluid port 222, and a second end portion 223 that has a piston 23 slidingly and sealingly disposed therein. The piston 23 is movable against biasing action of a coil spring 21 in a first direction toward the first end portion 221 to cause the hydraulic fluid to flow out of the fluid port 222, and in a second direction away from the first end portion 221 due to restoration force of the coil spring 21 and in response to return flow of the hydraulic fluid into the fluid port 222. The hydraulic cylinder device 20 further includes a piston rod 24 that has a connecting end 241 connected to the piston 23 and a coupling end 242 extending out of the second end portion 223 of the hydraulic cylinder body 22.

Figure 2:
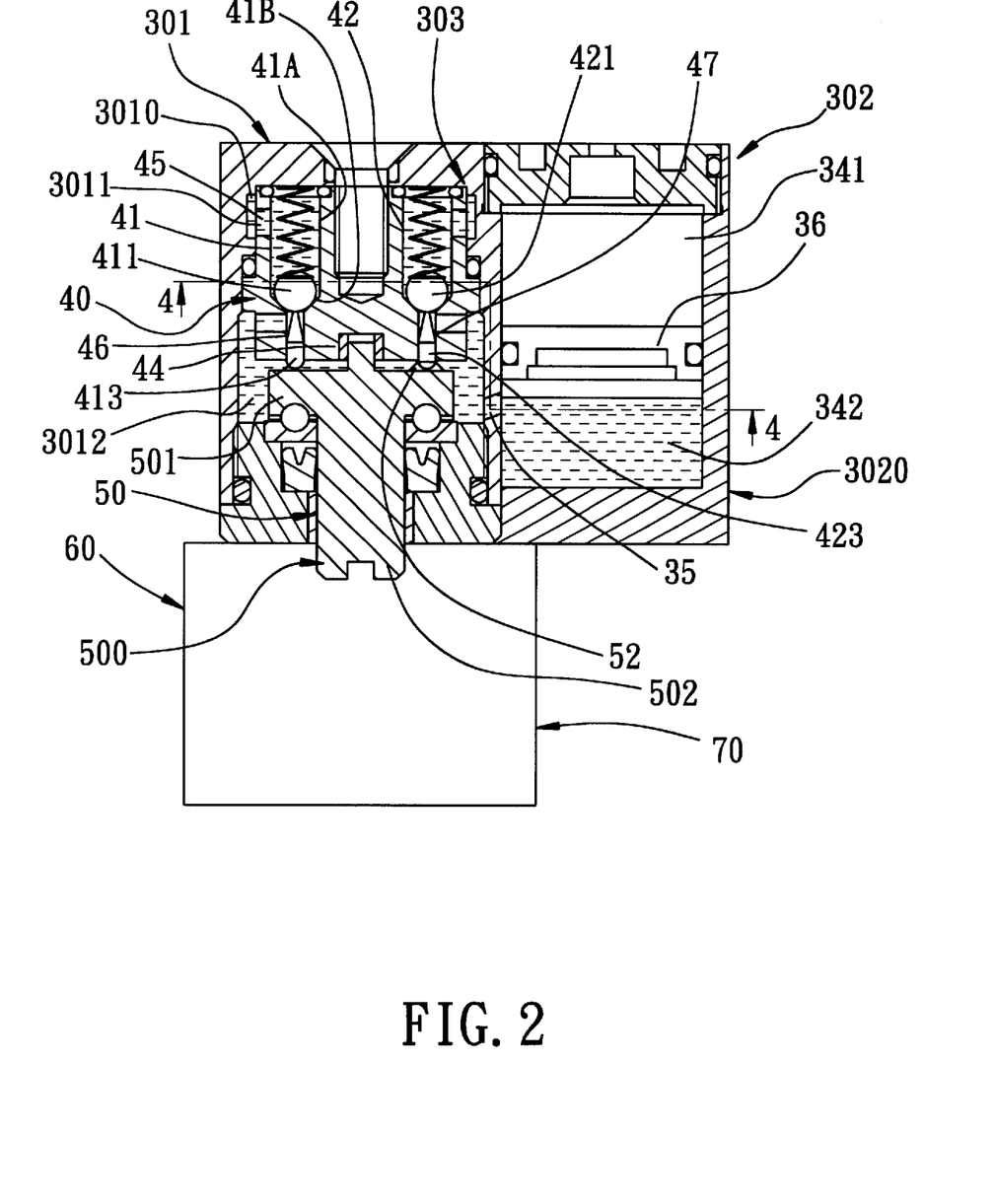
FIG. 2 is a sectional view of the fluid regulating device of the present invention.

The regulator housing 301 confines a valve receiving chamber 3011 and a fluid chamber 3012 adjacent to and below the valve receiving chamber 3011. The regulator housing 301 is formed with a fluid opening 32 that is in fluid communication with the valve receiving chamber 3011 and that is adapted to be connected fluidly to the fluid port 222 via a pipe 33. The fluid chamber 3012 is filled with the hydraulic fluid.

The pneumatic cylinder device 302 includes a cylinder housing 3020 with a piston member 36 slidingly and sealingly disposed therein. The piston member 36 divides an interior of the cylinder housing 3020 into an upper volume-variable gas compartment 341 and a lower volume-variable fluid compartment 342 on opposite sides of the piston member 36. The gas compartment 341 stores pressurized gas therein. The cylinder housing 3020 is further formed with a fluid aperture 35 that maintains fluid communication between the fluid chamber 3012 and the fluid compartment 342.

Figure 5:
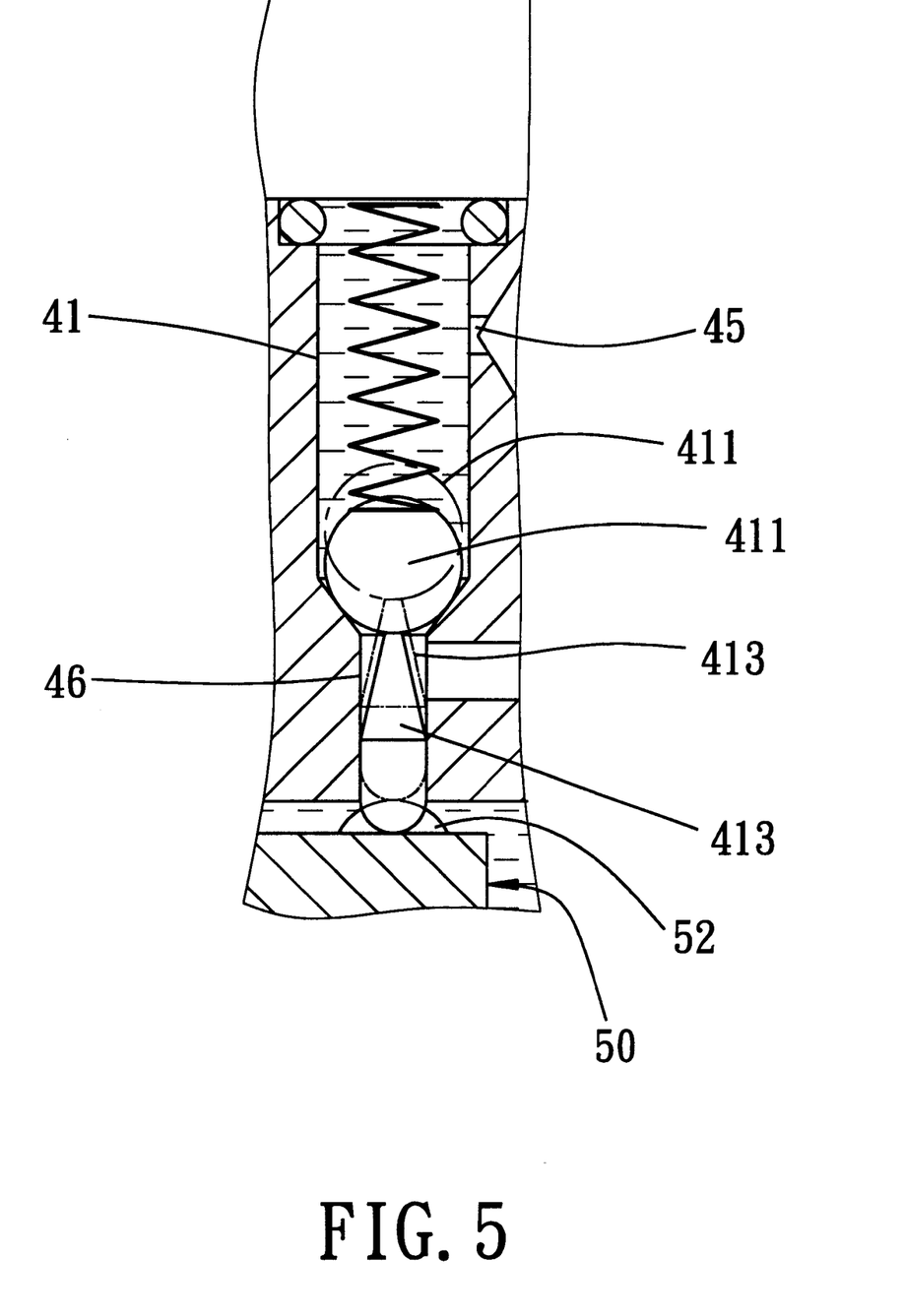
FIGS. 5 and 6 illustrate how the valve members employed in the fluid regulating device of the present invention are actuated by a valve actuator.
Figure 6:
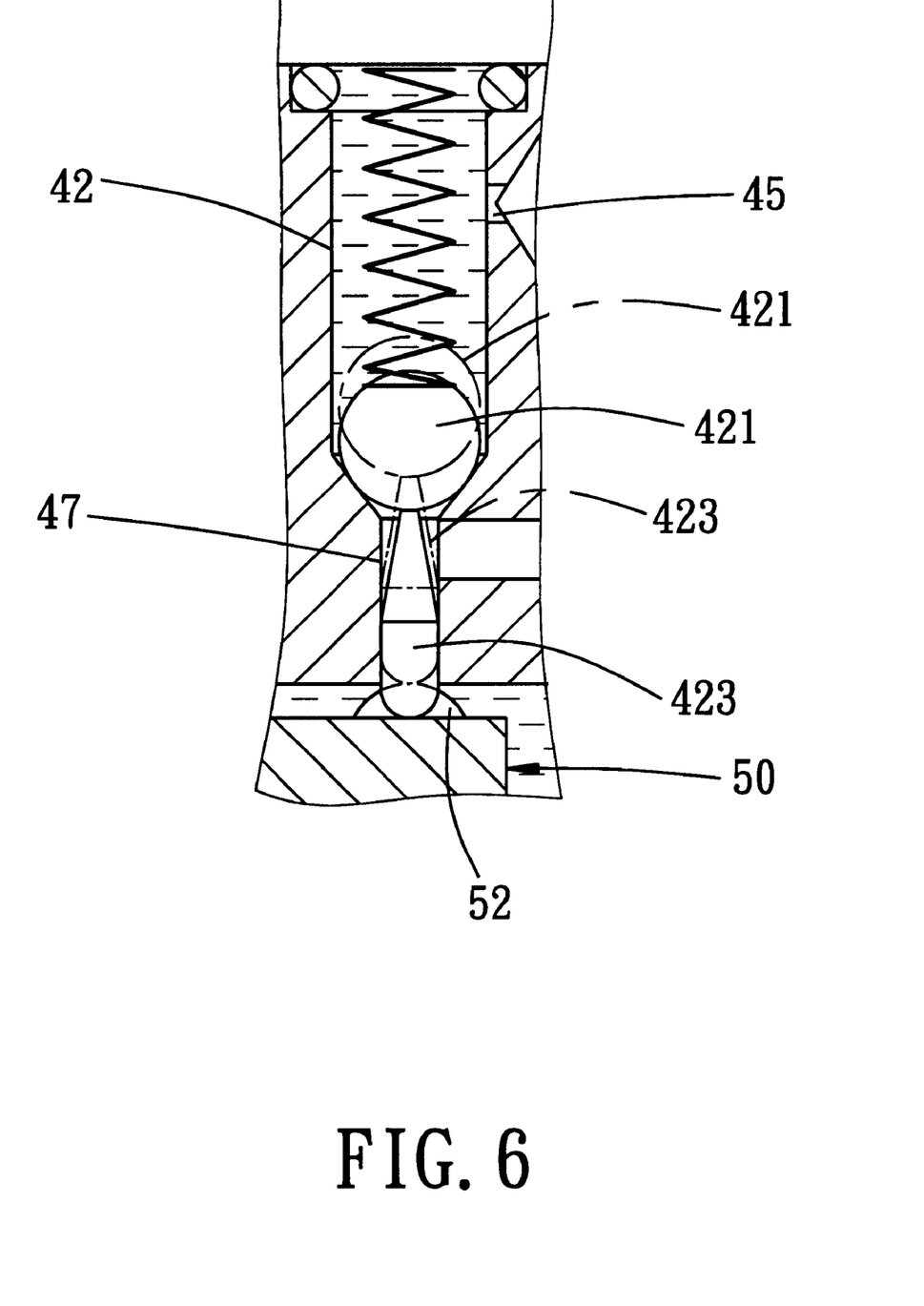

The regulating valve unit 303 is disposed in the valve receiving chamber 3011 to control flow rate of the hydraulic fluid between the fluid opening 32 and the fluid chamber 3012. The regulating valve unit 303 includes a valve body 40 mounted in and in sealing contact with the valve receiving chamber 3011. The valve body 40 is formed with two axially extending valve channels 41, 42 for fluid communication between the fluid opening 32 and the fluid chamber 3012. The valve channels 41, 42 are angularly spaced apart from each other, and are offset relative to an axis of the valve body 40. Each of the valve channels 41, 42 is formed with a respective rate control passage 46, 47. The rate control passages 46, 47 of the valve channels 41, 42 have different diameters, as best shown in FIGS. 5 and 6.

Two valve members 411, 421 (see FIG. 2) are disposed respectively in the valve channels 41,42. Each of the valve members 411,421 is capable of being actuated to move from a normal blocking state, where fluid communication between the fluid opening 32 and the fluid chamber 3012 is interrupted in the respective one of the valve channels 41,42, to an unblocking state, where fluid communication between the fluid opening 32 and the fluid chamber 3012 is permitted in the respective one of the valve channels 41,42.

The valve actuator 50 is associated with the regulating valve unit 303, and is operable so as to actuate a selected one of the valve members 411, 421 to move from the blocking state to the unblocking state.

The regulator housing 301 is formed with a peripheral groove 3010 communicated with fluid holes 45 in the valve body 40. Each of the fluid holes 45 communicates a respective one of the valve channels 41, 42 with the fluid opening 32 via the peripheral groove 3010.

The valve actuator 50 of the preferred embodiment is a rotary member 500 mounted rotatably on the regulator housing 301 inside the fluid chamber 3012, and has a rotary axis parallel to the valve channels 41, 42. The rotary member 500 has an upper side 501 that confronts the valve body 40 and that is sufficiently sized such that an outer periphery thereof circumscribes the valve channels 41,42. The upper side 501 of the rotary member 500 is provided with a central connecting portion 51 that extends rotatably into a bottom recess 44 in the valve body 40 to permit rotation of the rotary member 500 relative to the valve body 40, and an actuating member 52 offset relative to the connecting portion 51 for actuating the selected one of the valve members 411, 421 to move from the blocking state to the unblocking state when the rotary member 500 is rotated about the rotary axis to align the actuating member 52 with the valve channel 41, 42 that contains the selected one of the valve members 411, 421.

In the preferred embodiment, the rotary member 500 has a drive shaft 502 that extends outwardly of the regulator housing 301. An electric controller 60 is coupled to the drive shaft 502, and is operable so as to drive rotation of the rotary member 500 about the rotary axis. A remote control unit 80 is provided for remote control operation of the controller 60. A switch 82 is provided for switching the controller 60 to automatic or manual control. The valve actuator 50 further includes a shock sensor 70 connected electrically to the controller 60 so as to provide a shock signal indicative of amount of shock detected by the shock sensor 70 to the controller 60 such that the controller 60 drives rotation of the rotary member 500 automatically to align the actuating member 52 with an appropriate one of the valve channels 41, 42 that is selected in accordance with the shock signal.

Each of the valve members 411, 421 is a spring-loaded ball valve member. Each of the valve channels 41, 42 has a valve receiving portion (41A) between the fluid opening 32 and the rate control passage 46, 47, and a valve seat portion (41B) between the valve receiving portion (41A) and the rate control passage 46, 47. Each of the rate control passages 46, 47 is disposed between the valve seat portion (41B) and the fluid chamber 3012. Each of the valve members 411, 421 is disposed in the valve receiving portion (41A) of the respective one of the valve members 411, 421. The rate control passage 46, 47 of each of the valve channels 41, 42 has a needle 413 that is disposed slidably therein and that extends into the fluid chamber 3012 toward the upper side 501 of the rotary member 500. Alignment of the actuating member 52 with the valve channel 41, 42 that contains the selected one of the valve members 411, 421 enables the actuating member 52 to urge the needle 413, 423 for moving the selected one of the valve members 411, 421 to the unblocking state.

Figure 7:
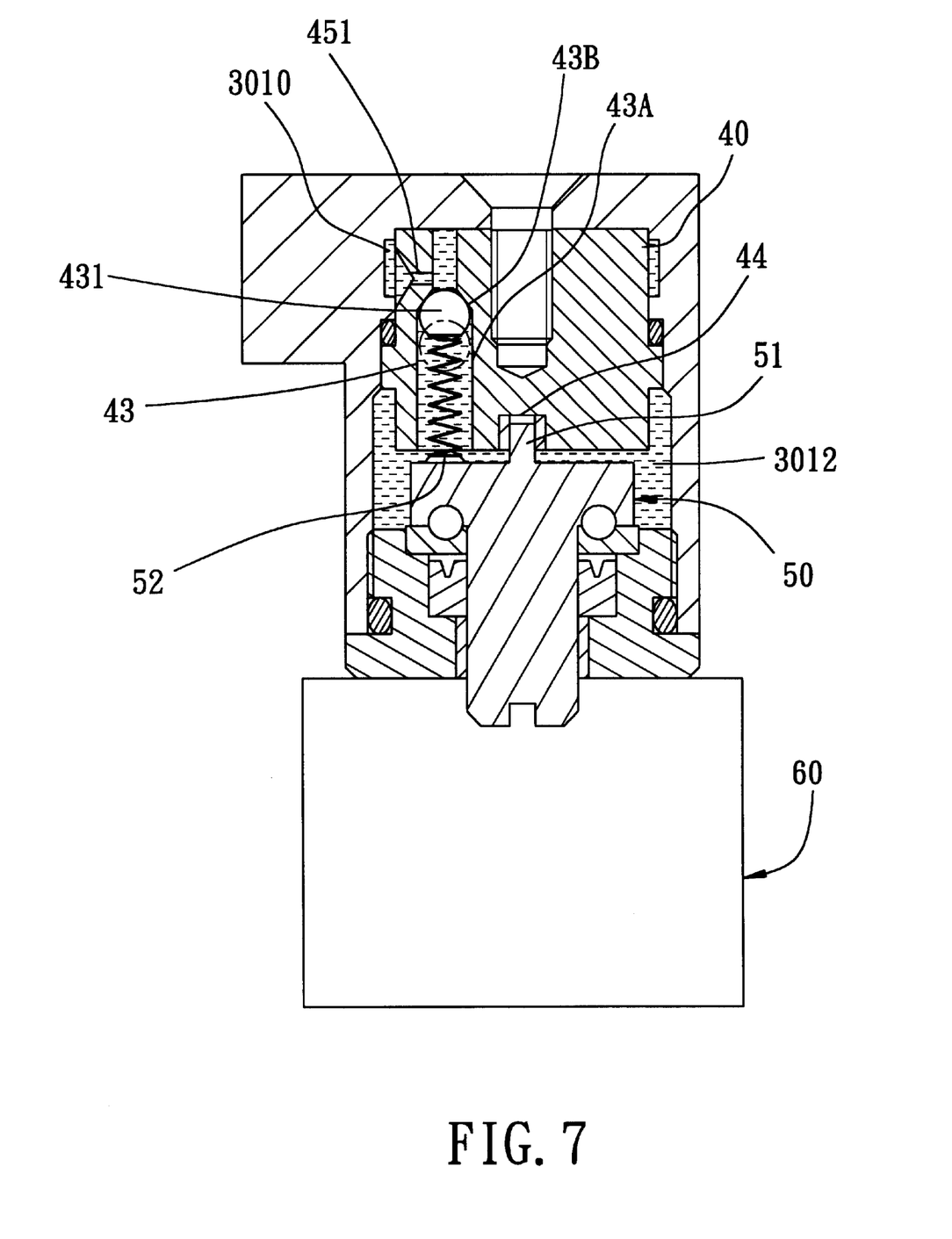
FIG. 7 is a sectional view of the fluid regulating device of the present invention viewed from another angle.

With reference to FIG. 7, in the preferred embodiment, the valve body 40 is further formed with an auxiliary valve channel 43 for fluid communication between the fluid opening 32 (see FIG. 3A) and the fluid chamber 3012 via a fluid hole 451 and the peripheral groove 3010. The auxiliary valve channel 43 has an auxiliary valve receiving portion (43A) between the fluid hole 451 and the fluid chamber 3012, and an auxiliary valve seat portion (43B) between the fluid hole 451 and the auxiliary valve receiving portion (43A). A spring loaded auxiliary ball valve member 431 is disposed in the auxiliary valve receiving portion (43A) and acts in an opposite direction of the valve members 431 in the valve channel 43. The auxiliary ball valve member 431 is movable from a blocking state, where the auxiliary valve seat portion (43B) is blocked to interrupt fluid communication between the fluid opening 32 and the fluid chamber 3012 via the auxiliary valve channel 43, to an unblocking state, where the auxiliary valve seat portion (43B) is unblocked to permit fluid communication between the fluid opening 32 and the fluid chamber 3012 via the auxiliary valve channel 43 in response to fluid pressure entering into the fluid opening 32.

Figure 1:
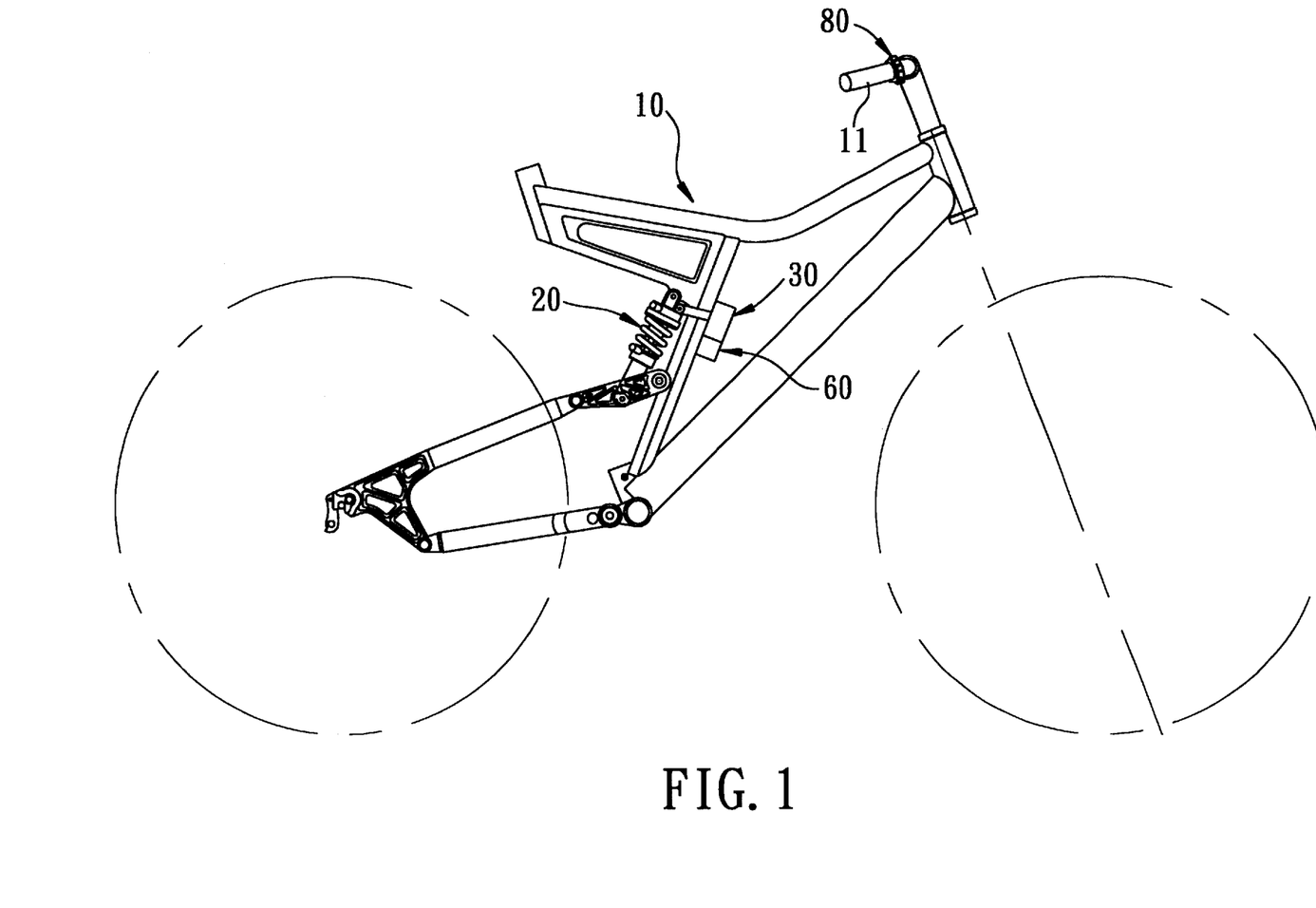
FIG. 1 shows a bicycle in which a fluid regulating device of the present invention is mounted for use with a hydraulic cylinder device to serve as a shock absorbing apparatus.

As best illustrated in FIG. 1, the preferred embodiment of the present invention is mounted on a front wheel carrying frame member of the bicycle 10, while the hydraulic cylinder device 20 is mounted between front and rear wheel carrying frame members of the bicycle 10. The remote control unit 80 can be mounted on the handle bar 11 of the bicycle 10. The remote control unit 80 is provided with three press buttons 81 (see FIG. 3B) for rotation of the rotary member 500 about the rotary axis in three different angular distances for aligning the actuating member 52 with the valve members 411, 421, 431, respectively.

As best shown in FIG. 5, in case the bicycle 10 (see FIG. 1) travels along an uneven road surface, pressing action on the uppermost switch 81 (see FIG. 3B) will enable the controller 60 to cause the rotary member 500 to rotate so as to align the actuating member 52 with the valve channel 41, thereby pushing the needle 413 interiorly of the valve channel 41 with the larger valve control passage 46 and consequently permitting hydraulic fluid from the fluid chamber 22 (see FIG. 3A) to flow into the fluid chamber 3012, and hence the volume-variable fluid compartment 342. The pressurized gas in the volume-variable gas compartment 341 is compressed, thereby absorbing the shock that is experienced when the bicycle 10 is in motion.

Referring to FIG. 6, in case the bicycle travels along an even road surface, operation of another one of the switches 81 will enable the controller 60 to cause the rotary member 500 to rotate in order to establish fluid communication between the fluid opening 32 and the fluid chamber 3012 and the volume-variable fluid compartment 342 via the smaller rate control passage 47. The smaller rate of fluid flow is ideal for absorbing relatively weak shock.

Referring again to FIG. 7, in case a relatively strong shock is experienced, hydraulic fluid from the hydraulic cylinder body 22 (see FIG. 3A) can push the auxiliary valve member 431 and flow into the fluid chamber 3012 and hence the fluid compartment 342 via the auxiliary valve channel 43, thereby enhancing adaptability of the present invention to the road condition.

With this invention thus explained, it is apparent that numerous modifications and variations can be made without departing from the scope and spirit of this invention. It is, thus, intended that this invention be limited only as indicated in the appended claims.

I claim:

1. A fluid regulating device adapted for use with a hydraulic cylinder device to form a shock absorbing apparatus with a variable shock absorbing effect, the hydraulic cylinder device including a hydraulic cylinder body filled with hydraulic fluid, the hydraulic cylinder body including a first end portion formed with a fluid port, and a second end portion having a piston slidingly and sealingly disposed therein, the piston being movable in a first direction toward the first end portion to cause the hydraulic fluid to flow out of the fluid port, and in a second direction away from the first end portion in response to return flow of the hydraulic fluid into the fluid port, the hydraulic cylinder device further including a piston rod having a connecting end connected to the piston and a coupling end extending out of the second end portion of the hydraulic cylinder body, the fluid regulating device comprising:

a regulator housing confining a valve receiving chamber and a fluid chamber adjacent to said valve receiving chamber, said regulator housing being formed with a fluid opening that is in fluid communication with said valve receiving chamber and that is adapted to be connected fluidly to the fluid port, said fluid chamber being filled with the hydraulic fluid;

a pneumatic cylinder device having a cylinder housing with a piston member slidingly and sealingly disposed therein, said piston member dividing an interior of said cylinder housing into a volume-variable gas compartment and a volume-variable fluid compartment on opposite sides of said piston member, said gas compartment storing pressurized gas therein, said cylinder housing being formed with a fluid aperture that maintains fluid communication between said fluid chamber and said fluid compartment;

a regulating valve unit disposed in said valve receiving chamber to control flow rate of the hydraulic fluid between said fluid opening and said fluid chamber, said regulating valve unit including:

a valve body mounted in and in sealing contact with said valve receiving chamber, said valve body being formed with a plurality of valve channels for fluid communication between said fluid opening and said fluid chamber, each of said valve channels being formed with a respective rate control passage, each rate control passages having a different diameter, and a plurality of valve members disposed respectively in said valve channels, each of said valve members being capable of being actuated to move from a normal blocking state, where fluid communication between said fluid opening and said fluid chamber is interrupted in the respective one of said valve channels, to an unblocking state, where fluid communication between said fluid opening and said fluid chamber is permitted in the respective one of said valve channels; and a valve actuator associated with said regulating valve unit and operable so as to actuate a selected one of said valve members to move from the blocking state to the unblocking state; and wherein said valve channels are formed axially through said valve body, are angularly spaced apart from each other, and are offset relative to an axis of said valve body; and wherein said valve actuator includes a rotary member mounted rotatably on said regulator housing inside said fluid chamber, said rotary member having a rotary axis parallel to said valve channels, and having one side that confronts said valve body and that is sufficiently sized such that an outer periphery thereof circumscribes said valve channels, said one side of said rotary member being provided with an actuating member for actuating the selected one of said valve members to move from the blocking state to the unblocking state when said rotary member is rotated about the rotary axis to align said actuating member with said valve channel that contains the selected one of said valve members.

2. The fluid regulating device as defined in claim 1, wherein said rotary member has a drive shaft that extends outwardly of said regulator housing, said valve actuator further including a controller coupled to said drive shaft and operable so as to drive rotation of said rotary member about the rotary axis.

3. The fluid regulating device as defined in claim 2, wherein said valve actuator further includes a remote control unit for remote control operation of said controller.

4. The fluid regulating device as defined in claim 2, wherein said valve actuator further includes a shock sensor connected electrically to said controller so as to provide a shock signal indicative of amount of shock detected by said shock sensor to said controller, said controller driving rotation of said rotary member to align said actuating member with an appropriate one of said valve channels that is selected in accordance with the shock signal.

5. The fluid regulating device as defined in claim 1, wherein each of said valve members is a spring-loaded ball valve member.

6. The fluid regulating device as defined in claim 5, wherein each of said valve channels has a valve receiving portion between said fluid opening and said rate control passage, and a valve seat portion between said valve receiving portion and said rate control passage, said rate control passage being disposed between said valve seat portion and said fluid chamber, each of said valve members being disposed in said valve receiving portion of the respective one of said valve members.

7. The fluid regulating device as defined in claim 6, wherein said rate control passage of each of said valve channels has a needle that is disposed slidably therein and that extends into said fluid chamber toward said one side of said rotary member, alignment of said actuating member with said valve channel that contains the selected one of said valve members enabling said actuating member to urge said needle for moving the selected one of said valve members to the unblocking state.

8. The fluid regulating device as defined in claim 7, wherein said valve receiving chamber is disposed above said fluid chamber.

9. The fluid regulating device as defined in claim 5, wherein said valve body is further formed with an auxiliary valve channel for fluid communication between said fluid opening and said fluid chamber, said auxiliary valve channel having an auxiliary valve receiving portion between said fluid opening and said fluid chamber, and an auxiliary valve seat portion between said fluid opening and said auxiliary valve receiving portion, said regulating valve unit further including a spring-loaded auxiliary ball valve member disposed in said auxiliary valve receiving portion, and acting in an opposite direction of said valve members in said valve channels, said auxiliary ball valve member being movable from a blocking state, where said auxiliary valve seat portion is blocked to interrupt fluid communication between said fluid opening and said fluid chamber via said auxiliary valve channel, to an unblocking state, where said auxiliary valve seat portion is unblocked to permit fluid communication between said fluid opening and said fluid chamber via said auxiliary valve channel in response to fluid pressure entering into said fluid opening.

* * * * *